United States Patent [19]

Fujiwara

[11] Patent Number: 4,620,098
[45] Date of Patent: Oct. 28, 1986

[54] RADIATION PHOTOGRAPHING APPARATUS

[75] Inventor: Shigemi Fujiwara, Ootawara, Japan

[73] Assignee: Kabushiki Kaisha Toshiba, Japan

[21] Appl. No.: 636,592

[22] Filed: Aug. 1, 1984

[30] Foreign Application Priority Data

Aug. 2, 1983 [JP] Japan ................. 58-140587

[51] Int. Cl.⁴ .............................. G03G 5/16
[52] U.S. Cl. ................. 250/327.2; 250/354.1
[58] Field of Search ............... 250/327.2, 354.1; 378/172, 178, 176, 146

[56] References Cited

U.S. PATENT DOCUMENTS

| | | | |
|---|---|---|---|
| 3,859,527 | 1/1975 | Luckey | 250/327 |
| 3,862,426 | 1/1975 | Thomas | 250/402 |
| 4,284,889 | 8/1981 | Kato et al. | 250/337 |
| 4,357,538 | 11/1982 | Hunt et al. | 378/175 |
| 4,392,239 | 7/1983 | Wilkens | 378/172 |

FOREIGN PATENT DOCUMENTS 0032521 7/1981 European Pat. Off. .
0094843 11/1983 European Pat. Off. .

*Primary Examiner*—Carolyn E. Fields
*Assistant Examiner*—R. Hanig
*Attorney, Agent, or Firm*—Finnegan, Henderson, Farabow, Garrett & Dunner

[57] ABSTRACT

With this radiation photographing apparatus, radiation image converting panels (or IPs) of the same size are used. X-rays shot through an X-ray tube are focussed to have a predetermined size by an X-ray diaphragm to expose a patient and to expose the IP with the penetrated X-rays. This IP is picked up from a feed magazine by a spot shot device, and is supported and set at a photographing position by a holder. The exposed IP is set in an image reading device. Only that area which has been exposed by X-rays is irradiated by a laser beam in the reading device. This area is scanned by the laser beam, and phosphorescence is emitted from the IP when it is irradiated and converted to an electric signal by a photodetector. This detection signal is sent to a image reproducing device to display the X-ray image.

6 Claims, 6 Drawing Figures

RADIATION PHOTOGRAPHING APPARATUS

BACKGROUND OF THE INVENTION

The present invention relates to a radiation photographing apparatus using radiation image converting panels.

With the conventional radiation photographing apparatus such as the X-ray photographing apparatus, for example, X-rays which have passed through body tissues of a patient are exposed on a photographic film to obtain an X-ray image. However, the X-ray photographing apparatus which uses this film has been questioned these days because the silver which is used to make it is becoming more scarce.

A technique disclosed in U.S. Pat. No. 3,859,527 has attracted attention under this circumstance, proposing a method of recording X-ray images without using silver. In the case of this radiation image converting method, radiation image converting panels each having a stimulable phosphor are used. X-rays which have passed through the patient's body tissues are absorbed by the stimulable phosphor of the panel. When the surface of the radiation image converting panel is then scanned by excitation light, the image stored in the stimulable phosphor is picked up as phosphorescence, which is detected and electrically treated to form a radiation-penetrated image.

In the X-ray photographing apparatus which uses conventional X-ray film, the demand has changed from the cassette type, wherein film is housed in a cassette which is set in a camera every time a photograph is taken, to the cassetteless type, wherein film is picked up from a magazine in which a plurality of films are housed, and in which the film is fed to the section where X-ray photography is carried out. In the case of this cassetteless type, several magazines are prepared, one for every film size, to enable photography to be carried out using various film sizes.

FIG. 1 shows the conventional X-ray photographing apparatus of the film cassetteless type. An upper X-ray tube 12 is opposite a lower spot shot means 14, with a patient 10 interposed between them. The spot shot means 14 is provided with three openings 16, 18 and 20 for film magazines. A feed magazine 22 in which one size of film is housed is inserted into the opening 16. Another magazine 24 in which a second size of film is housed or a third magazine 26 in which a third size of film is housed can be inserted into the second opening 18. Exposed films of various sizes are received in a magazine 28 which is inserted into the third opening 20. The passage of film from the magazines 22, 24, 26 to exposure position and then from the exposure position to the magazine 28 has a construction which enables any size of film to be conveyed.

With the conventional X-ray photography apparatus of the cassetteless type, therefore, a plurality of feed and pickup magazines must be provided, thereby making its operation troublesome and its construction complicated. In addition, the construction of its conveying line becomes complicated in order to enable the various sizes of films to be conveyed.

SUMMARY OF THE INVENTION

The object of the present invention is to provide a radiation photographing apparatus of the cassetteless type, that is simple in construction and easy to operate, wherein radiation image converting panels are used and various sizes of radiation images can be easily obtained.

A radiation photographing apparatus embodied according to the present invention and capable of photographing the radiation-penetrated image of a patient in various sizes comprises radiation image converting panels, each absorbing the energy of the radiation and emitting this energy as phosphorescence when they are irradiated by light beam; a spot shot device including a feed magazine for housing the radiation image converting panels and a holder for holding the radiation image converting panel supplied from the feed magazine and for setting the panel at a radiation photographing position; a device for exposing radiation at a predetermined photographing area of the radiation image converting panel which has been set at the photographing position, with the patient interposed between the panel and the radiation exposing means; a device for reading the radiation-penetrated image by using the radiation image converting panel which has been shot with radiation, said reading means including a light beam irradiating means for scanning the radiation-shot area with a light beam, and a detector means for detecting the phosphorescence when the panel is irradiated by a light beam, and for converting the phosphorescence to an electrical signal; and an image reproducing device for receiving the detection signal from the reading means and for image-treating on the basis of this detection signal to display a radiation image.

According to the present invention, radiation images of all sizes can be photographed using the same radiation image converting panels. In short, feed magazines exclusively used for every size film are not needed and the conveying for the radiation image converting panels may be fitted for only one size, thereby making its construction simple, and the spot shot means small and lightweight. Various sized radiation photographing areas can be photographed by only setting the feed magazine, in which the radiation image converting panels having the same size have been housed, into the spot shot means, thereby enhancing the operation of the device.

Since only one kind of radiation image converting panels needs to be housed in the feed and takeup magazines, the surfaces of the radiation image converting panels themselves can be more easily protected from damage as compared to where a variety of radiation image converting panels are used, thereby making the life of the radiation image converting panels longer.

The radiation image converting panels of the same size can be used repeatedly, and radiation images of excellent quality can be obtained.

DETAILED DESCRIPTION OF THE PREFERRED EMBODIMENT

Figure 1:
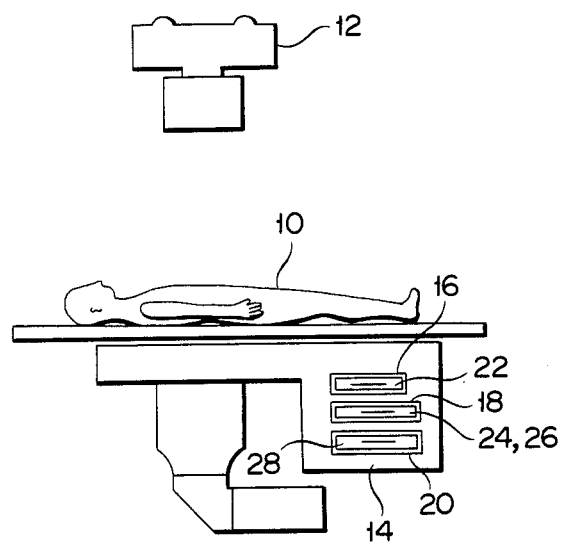
FIG. 1 is a side view showing the conventional radiation photographing apparatus of the cassetteless type.
Figure 2:
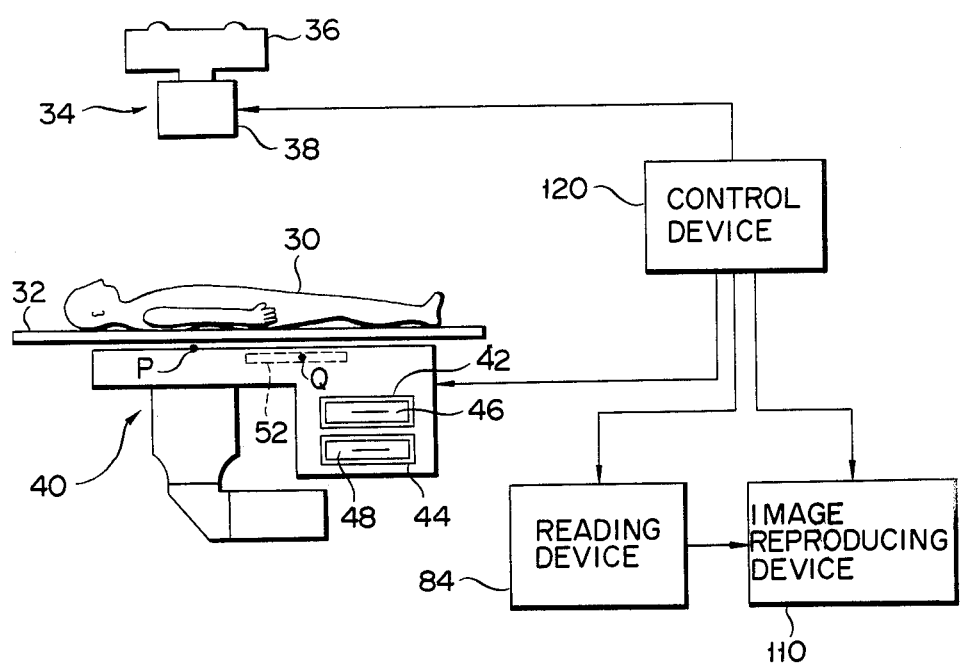
FIG. 2 shows an example of the radiation photographing apparatus according to the present invention.

FIG. 2 shows an example of an X-ray photographing apparatus according to the present invention. A spot shot device 40 has a couch 32 mounted thereon, and a patient 30 to be photographed lies down on the couch 32. An X-ray tube 36 of an X-ray exposing device 34 is arranged above a photographing position P of the spot shot device 40. High voltage is applied from a high voltage generating device (not shown) to the X-ray tube 36 to expose the X-rays. This X-ray flux is focussed at a predetermined X-ray irradiation field by means of an X-ray diaphragm 38.

The spot shot device 40 has two magazine inserting openings 42 and 44 on one side. Inserted into the opening 42 is a feed magazine 46 in which X-ray image converting panels of a third size, the largest of the above-mentioned three sizes, have been housed. Also inserted into the opening 44 is a takeup magazine 48 in which the exposed X-ray image converting panels are received.

As for the X-ray image converting panel (which will be hereinafter referred to as an imaging plate or IP), one disclosed by Japanese Patent Disclosure Nos. 81-12600, 82-24900 and 82-96300, for example, can be used. This IP is made by coating a disperser on a polyester base in which crystals of BaFX (X represents halogen) are dispersed in a binder with a high filling rate. When that image recording layer on the base which consists of halogen crystals is irradiated by X-rays, the energy of the X-rays is trapped in the image recording layer. When this image recording layer, in which an X-ray image has been trapped, is irradiated and stimulated by a laser beam, the trapped energy is released from the recording layer to emit phosphorescence. Therefore, the X-ray image recorded on the IP can be made visible by scanning the recording layer with a laser beam, by detecting the phosphorescence emitted, and by image-treating it.

A holder 52 for the IP is arranged to be movable lengthwise and in the transverse directions of the couch 32, at the upper portion inside the housing of the spot shot device, as described later. The IP picked up from the feed magazine 46 is conveyed by a conveying means (not shown) arranged inside the housing to a position Q where the IP is set on the holder 52 waiting there. The holder 52 on which the IP has been set moves from the position Q to the photographing position P where X-rays passed through body tissues of the patient 30 are exposed on the IP. The holder 52 then returns to the position Q where the IP is transferred to the conveying line, through which it is fed to and received in the takeup magazine 48.

Figure 3:
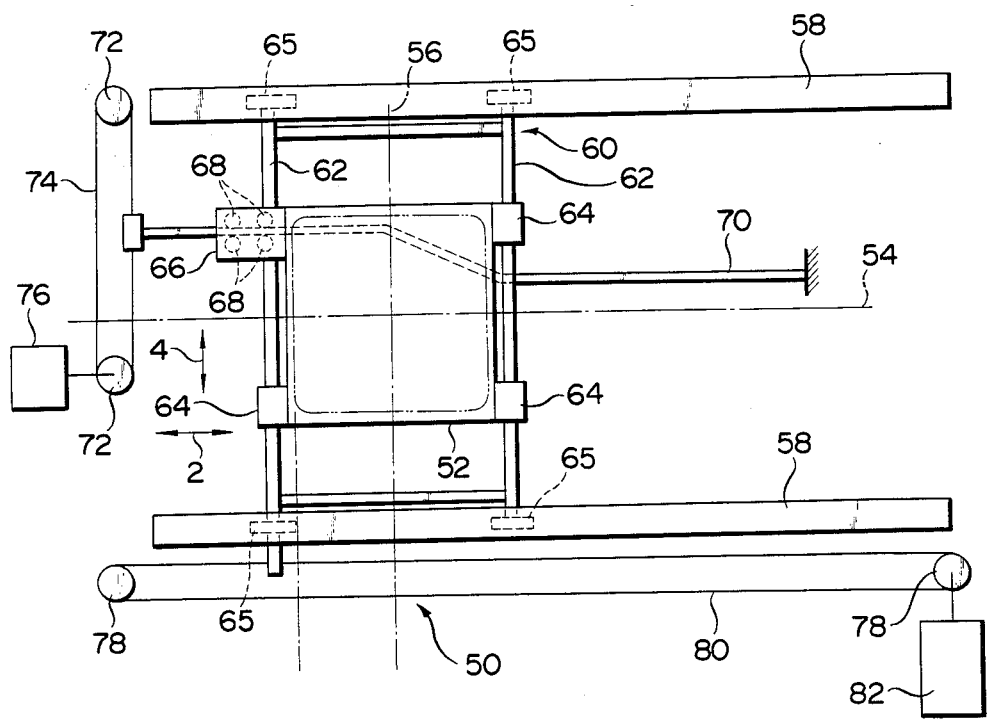
FIG. 3 is a plan view showing the running system of the apparatus.

A means 50 for moving the holder 52 will be described referring to FIG. 3. A center line 54 of the X-ray-irradiated field through the X-ray diaphragm 38 extends along the center of the couch 32, parallel to the length of the couch (or the direction shown by an arrow 2), while the other is a line 56 crossing the center line 54 at the photographing position P which is parallel to the transverse direction of the couch 32 (or the direction shown by an arrow 4). A pair of guide rails 58 extend in the direction 2, but are appropriately separated in the direction 4. A running member 60 has four rollers 65, which are engaged with the guide rails 58 and support the running member 60 movable along the guide rails 58 in the direction 2. The running member 60 also has a pair of rails 62 which extend in the direction 4. One end of one of the rails 62 is projected from the guide rail 58 and is connected to a chain 80 which is stretched between pulleys 78. One of the pulleys 78 is driven by a servomotor 82. The chain 80 is driven by the rotation of the servomotor 82, and the running member 60 can be moved in the direction 2 through the rail 62 connected to this chain 80. The holder 52 for the IP has support members 64 and 66 at its four corners. These support members 64, 66 are engaged with the rails 62 to enable the holder 52 to move in the direction 4. Particularly the support member 66 has two pairs of rollers 68, the rollers 68 of each pair being opposite to each other in the direction 4 and holding a flexible guide rail 70 between them. One end of the guide rail 70 is fixed, while the other is connected to a chain 74 stretched between pulleys 72, which are rotated by a servomotor 76. That end of the flexible guide rail 70 which is connected to the chain 74 is reciprocated in the direction 4 by the rotation of the pulleys 72. The holder 52 can be moved in the direction 4 through the guide rail 70. Therefore, the holder 52 can be reciprocated between the positions Q and P in the direction 2 by the rotation of the motor 82, while it can also be moved in the direction 4 by the rotation of the motor 76 to adjust its position in the direction 4.

Figure 4:
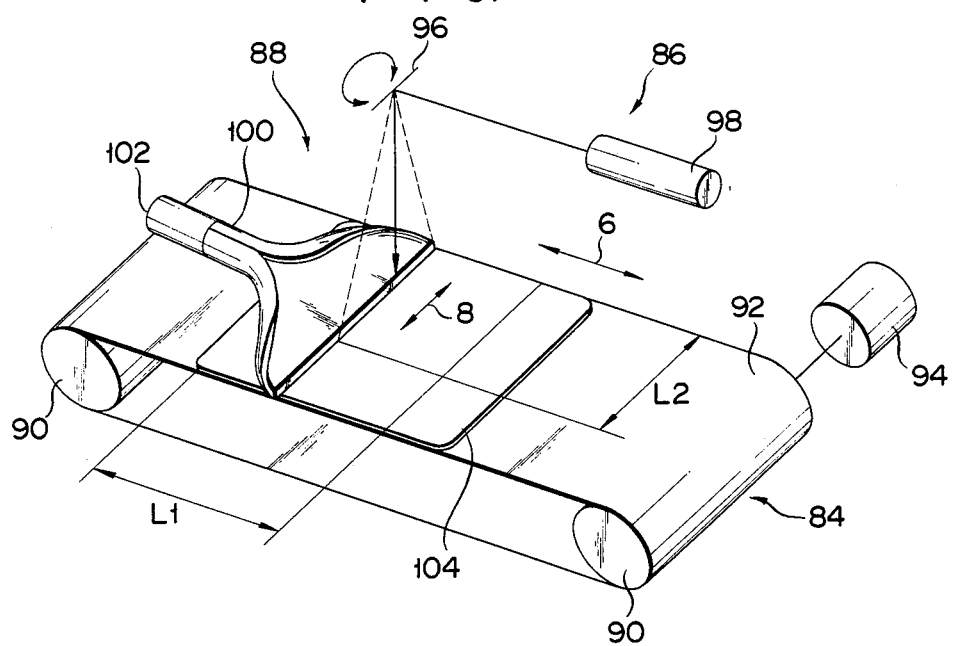
FIG. 4 is a perspective view showing an image reading device.

The IP on which the X-ray image which has passed through the patient 30 is exposed is housed in the takeup magazine 48. Then, the takeup magazine 48 is taken out of the spot shot device 40 and is set in a device 84 for reading the X-ray image (see FIG. 2). A laser beam irradiating means 86 and phosphorescence detecting means 88 are arranged in the reading device 84, as shown in FIG. 4. The irradiating means 86 has a conveying belt 92 stretched between a pair of pulleys 90. One of the pulleys 90 is driven by a servomotor 94, and the belt 92 is moved in a direction shown by an arrow 6 by the rotation of this pulley 90. The X-ray-exposed IP 104 is pulled out of the takeup magazine 48 and set in the reading device 84, where it is mounted on the belt 92. The irradiating means 86 has further a laser tube 98 for shooting a laser beam (500 to 800 nm), and a light reflector 96 for reflecting the laser beam shot by the laser tube 98 to scan the IP 104 on the belt 92 in a direction shown by an arrow 8. The light reflector 96 is driven and rotated by a driving means (not shown).

The detecting means 88 has a section 100 for condensing phosphorescence emitted from the IP, and a photodetector 102 for converting the light condensed by the light-condensing section 100 to an electric signal. That end of the light-condensing section 100 which is on the side of the IP 104 is made flat, extending along the scanning line of laser beam and in the direction 8. The other end thereof, which is on the side of the photodetector 102, is curved and rounded to connect to the photodetector 102. The light-condensing section 100 is made of a material which can transmit light. The phosphorescence entering into the light-condensing section 100 through the end on the side of the IP can be thus guided toward the photodetector 102 by means of the light-condensing section 100. Output of the photodetector 102 is applied to an image reproducing device 110 (see FIG. 2).

The driving means for the light reflector 96 and the servomotor 94 are controlled by a control device 120 in such a way that only the area of the IP which has been exposed to X-rays (or used for photography) is irradiated by the laser beam. This can be carried out as follows by attaching a bar code label corresponding to the size and position of the exposed area to the underside of the IP 104, for example. The area of the IP which is to be photographed (area of first, second or third size, for example) is determined according to the object under medical examination, and the X-ray exposing device is controlled by a control signal applied from the control device 120 so as to overlap the X-ray exposing field onto this area of the IP. A reader for reading the bar code label is arranged under the IP set at the photographing position of the spot shot device to read this code during X-ray exposure. The number of this code read by the reader is applied to the control device 120 and is stored there together with the X-ray exposing field $L_1 \times L_2$ (as a first, second or third size). The code of the IP which is to be mounted on the belt 92 is read by the image reading device 84 and is applied to the control device 120. The control device 120 uses this code as an index to detect the area of the IP which has been exposed by X-rays. In order to align this area with the light beam irradiated area, the control device 120 adjusts the rotation angle of the light reflector 96 to make the length of the scanning line on the IP equal to $L_2$ and also adjusts the rotation number of the servomotor 94 to make the length of the irradiated area equal to $L_1$.

The image reproducing device 110 converts an output signal of the photodetector 102 into digital data and stores it therein. After data relating to the entire irradiated area of the IP is obtained, it is image-treated to display the X-ray-penetrated image on a display device (not shown) such as a CRT. It is preferable in this case that the image reproducing device 110 has a capacity to treat the largest irradiated area of the IP 104. The reason for this is as follows. When the sizes of those areas where digital data is obtained are made equal to each other in either a large or small X-ray image, the amount of data obtained in the case of the large X-ray image is $M_1 \times M_2$, while it is $N_1 \times N_2 (M_1 > N_1, M_2 > N_2)$ case of the small X-ray image. Therefore, the amount of data becomes smaller in the small X-ray image, thereby causing the image treating capacity to be underused in the storing, calculating and other fields. When a small area to be photographed is digitally treated at the same ratio ($M_1 \times M_2$) as a large area, therefore, digital data can be more easily obtained at the smaller area having a small X-ray image than in the large X-ray image. The quality of the image reproduced from the small X-ray image can thus be enhanced. In order to obtain the same number of digital data regardless of the small or large X-ray image, the control device 120 adjusts the rotation speeds of the servomotor 94 and light reflector 96 according to the size of the X-ray exposed area.

In addition to controlling the image reading device 84 and image reproducing device 110 like this, the control device 120 also controls the X-ray exposing timing of the X-ray tube 36, the X-ray diaphragm 38 based upon the size of X-ray exposing area, and the position of the IP holder 52.

The feed magazine 46 in which the IPs 104 of the first largest practical size are housed is inserted into the opening 42, and the area of the patient 30 to be photographed is input to the control device by operating its switch (not shown). The control device 120 then sends a control signal to the X-ray diaphragm 38, which is focussed at the selected X-ray irradiated field.

Figure 5:
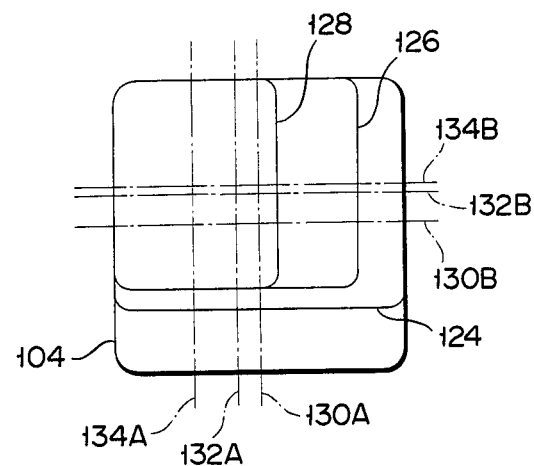
FIGS. 5 and 6 are plan views showing the relation between the various sizes of the photographing areas and the X-ray image converting panel.

Also, the control device 120 also sends a control signal to the spot shot device 40. A sheet of IP 104 is pulled out of the feed magazine 46 by the IP conveying means (not shown) in the spot shot device 40 and is set on the IP holder 52, as shown in FIG. 3. The IP holder 52 is then located at the photographing area P by the servomotors 82 and 76 controlled by the control device 120. With reference to FIG. 5, when the X-ray exposing area is of the first size, the center lines of the area are represented by 130A and 130B. When they are of the second size 124, they are represented by 130A and 132B. When they are of a third size 126, they are represented by 132A and 134B, and when they are of a fourth size 128, they are represented by 134A and 134B, as shown in FIG. 5. Therefore, the IP holder 52 is located at the photographing area in such a manner that the center lines 54, 56 of the X-ray irradiating field of the X-ray diaphragm 38 are aligned with those of the exposing area of the IP 104.

The patient 30 is then shot with X-rays from the X-ray tube 36. The X-rays which have passed through the body tissues of the patient 30 are absorbed by the image recording layer on the IP 104. After X-ray photography, the IP holder 52 returns from the photographing position P to the waiting position Q and the exposed IP 104 is received in the takeup magazine 48 through the IP conveying means (not shown).

The operator takes the takeup magazine 48 out of the opening 44 and sets the IP 104 in the magazine 48 in the reading device 84.

The reading device 84 is controlled by the control device 120 to drive the conveying belt 92 so as to locate the IP 104 at the scanning position. The IP 104 is scanned with a light beam which has been shot through the laser tube 98, rotating the reflector 96 and moving the conveying belt 92 in the direction 6. The area to be scanned this time is equal to $L_1 \times L_2$, corresponding to the area exosed with X-ray. Phosphorescence generated by the irradiation of the light beam is condensed by the light-condensing section 100, and is photoelectrically converted by the photodetector 102. An electric signal which contains data relating to the X-ray image is applied to the image reproducing device 110. The image reproducing device 110 is controlled by the control device 120 to convert the applied electric signal and to image-treat the analog signal to display an X-ray penetrated image on a CRT screen, for example.

Although one embodiment of the present invention has been described in detail, it should be understood that the present invention is not limited to the embodiment, but that various changes and the modifications can be made without departing from the scope and spirit of the present invention.

Figure 6:
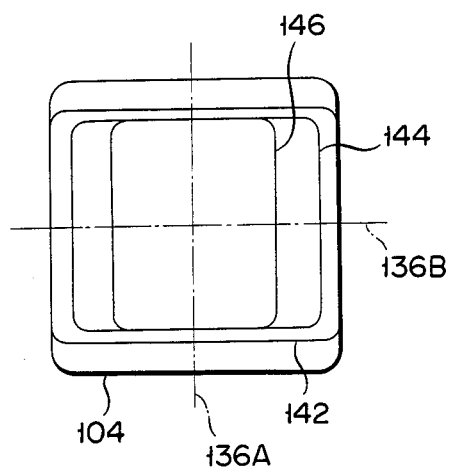

Although the center lines of the exposing area of the first-sized IP 104 are changed according to the size thereof, as shown in FIG. 5, in the case of the above-described embodiment, it may be arranged so that the center lines 136A and 136B are not changed, but that areas of variously-sized exposing areas are aligned with the center lines 136A and 136B, as shown in FIG. 6. More specifically, in the case of the first size of IP 104, the second size exposing area is denoted by 142, the third size exposing area is denoted by 144, and fourth exposing area by 146.

It may be arranged so that the IP 104 is made sufficiently large and that a plurality of fourth-sized X-ray images are photographed on a sheet of this IP 104.

Although the spot shot device 40 was made differently from the reading device 84 in the case of the above-described embodiment, they may be constructed as a unit so that the IP 104 is automatically picked up from the takeup magazine 48 in the spot shot device 40 by means of a pickup device (not shown) and mounted on the conveying belt 92 for the reading device 84.

It may be arranged so that the light-condensing section 100 consists of a plurality of optical fibers juxtaposed against one another.

What is claimed is:

1. A radiation photographing apparatus for photographing a radiation-penetrated image of a patient in several sizes, comprising:

radiation image converting panels each absorbing the energy of radiation and emitting this energy as phosphorescence when they are irradiated by a light beam, said panels having coded information corresponding to a predetermined photographing area on said panels;

spot shot means including a feed magazine for housing the radiation image converting panels, a holder for holding the radiation image converting panel supplied from the feed magazine and setting it at a radiation photographing position, and signal means for reading the coded information and for producing an output signal corresponding to said coded information;

means for exposing radiation at said predetermined photographing area on the radiation image converting panel which has been set at the photographing position, with the patient interposed between the panel and the radiation exposing means;

means for reading a radiation-penetrated image from the radiation image converting panel which has been exposed by radiation, said reading means including a light beam irradiating means for scanning the radiation image converting panel with a light beam, and detector means for detecting the phosphorescence when irradiated by the light beam and converting it to an electric detection signal;

image reproducing means for receiving said detection signal from the reading means and carrying out image-treatment on the basis of said detection signal to display a radiation-penetrated image; and control means for recognizing said predetermined photographing area based on the output signal of the signal means and adjusting the scanning area of the light beam of said reading means to said photographing area.

2. A radiation photographing apparatus for photographing a radiation-penetrated image of an object, comprising:

radiation exposing means for projecting radiation through said object onto a predetermined photographing area of a converting panel positioned at a photographing position, said converting panel absorbing the energy of said radiation incident thereon to store said radiation-penetrated image of said object and said emitting said image as phosphorescence when irradiated by light, the size of said predetermined photographing area being adjustable;

a spot shot means including means for holding said converting panel at said photographing position;

means for reading said radiation-penetrated image stored on said converting panel, said reading means including light beam irradiating means for scanning said photographing area of said converting panel with a light beam, detector means for detecting said phosphorescence emitted by said converting panel scanned with said light beam, and converting means for converting said emitted phosphorescence into an electric signal;

image reproducing means for receiving said electric signal from said reading means, for carrying out image treatment on said electric signal, and for displaying said radiation-penetrated image corresponding to said electric signal; and control means for delimiting the scanning of said light beam to said photographing area of said converting panel.

3. A radiation photographing apparatus according to claim 2, wherein said light beam irradiating means of said reading means includes laser means for projecting a laser beam, and reflector means for reflecting said laser beam projected by said laser means toward said converting panel, said reflector means including a rotating mirror rotation of which causes said reflected laser beam to traverse said converting panel in a scanning direction.

4. A radiation photographing apparatus according to claim 3, wherein said light beam irradiating means further includes belt means for conveying said converting panel in a direction perpendicular to said scanning direction while said laser means projects said laser beam.

5. A radiation photographing apparatus according to claim 4, wherein said control means delimits the scanning of said light beam to said photographing area of said converting panel by adjusting the rotation angle of said rotating mirror and the moving distance of said belt.

6. A radiation photographing apparatus according to claim 2, wherein said radiation exposing means includes an X-ray tube projecting X-rays and an X-ray diaphragm focussing said X-rays to said photographing area at said photographing position.

* * * * *